UNITED STATES PATENT OFFICE.

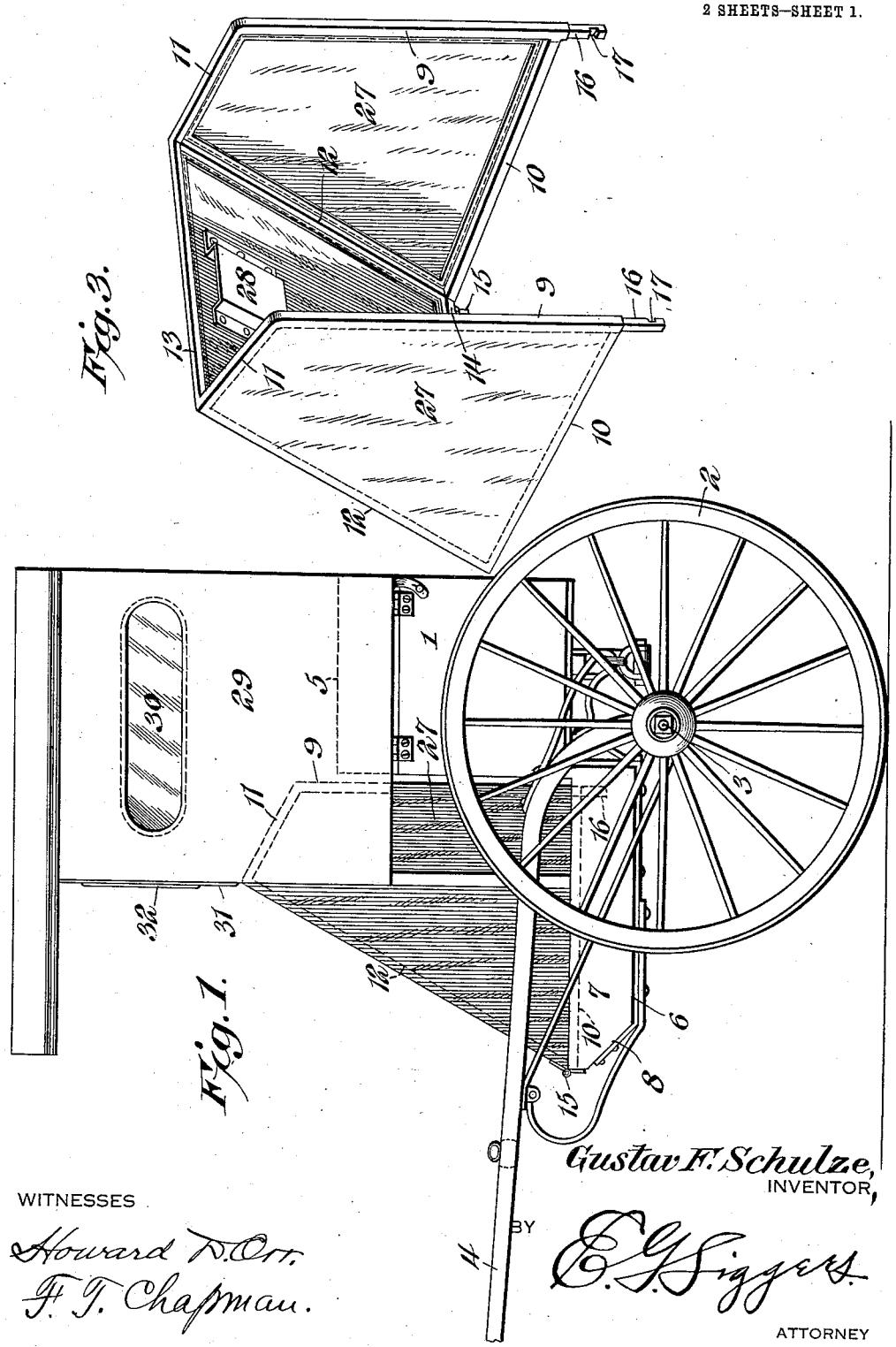

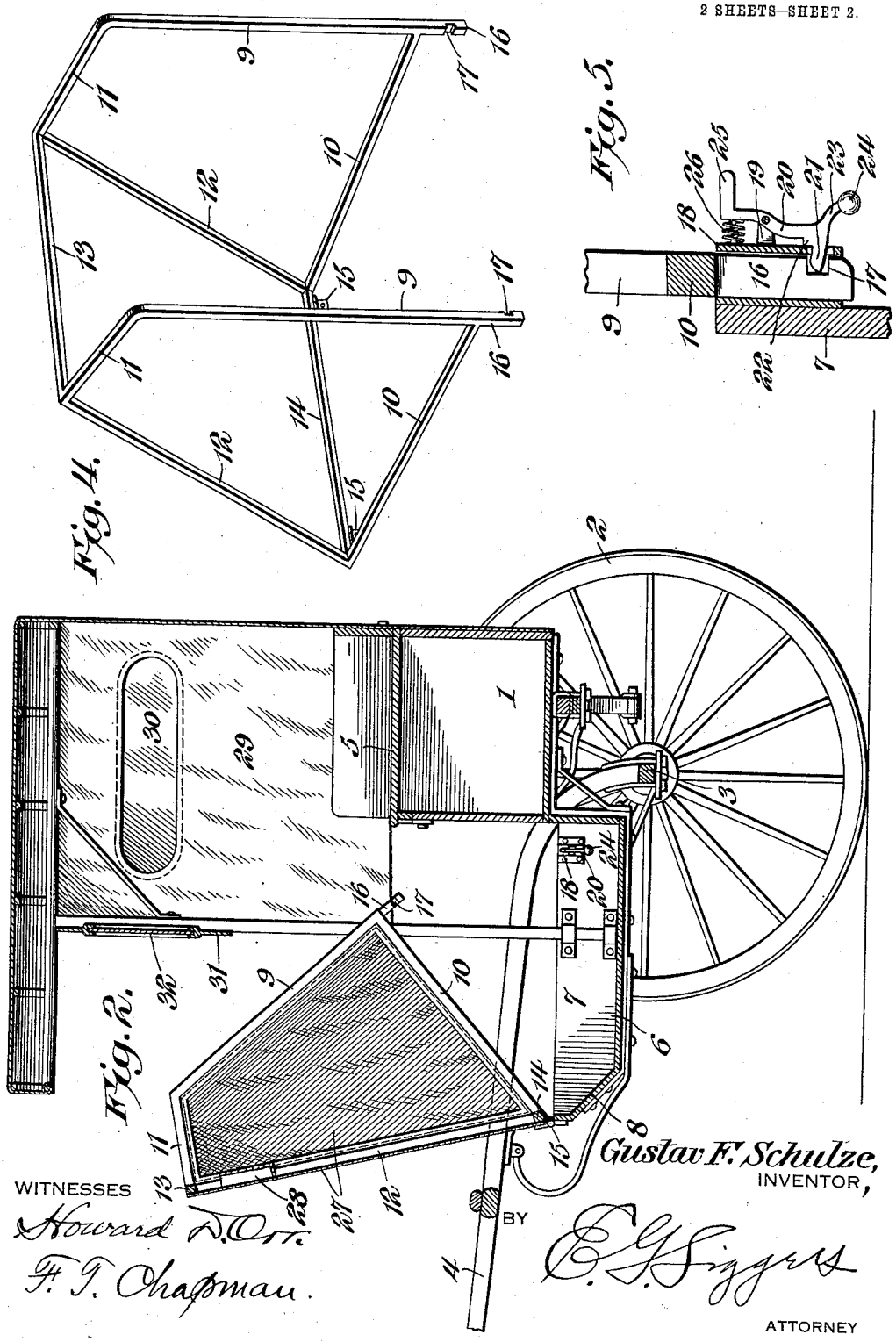

GUSTAV F. SCHULZE, OF VANDALIA, MISSOURI.

VEHICLE-APRON.

1,068,938. Specification of Letters Patent. Patented July 29, 1913.

Application filed November 7, 1910. Serial No. 591,183.

*To all whom it may concern:*

Be it known that I, GUSTAV F. SCHULZE, a citizen of the United States, residing at Vandalia, in the county of Audrain and State of Missouri, have invented a new and useful Vehicle-Apron, of which the following is a specification.

This invention has reference to improvements in vehicles, and more particularly to a protecting apron for the occupant of the vehicle, and is primarily intended for use in connection with a wagon or cart such as employed by postmen in the collection and delivery of mail on rural free delivery routes, although the invention is not necessarily limited to this particular use.

The present invention comprises an apron or protective structure so constructed as to always maintain its shape, but which may be moved in a direction permitting the occupant of the vehicle to alight therefrom or to enter the vehicle without interference from the apron, while when the occupant is in the vehicle the apron may be secured in place in a manner to thoroughly protect such occupant from wind or rain or snow.

The invention will be best understood from a consideration of the following detailed description taken in connection with the accompanying drawings forming a part of this specification, with the understanding, however, that while the drawing illustrates a practical form, the invention may be embodied in other forms than that shown, and for this reason the invention is not confined to the particular structure illustrated.

In the drawings: Figure 1 is a side elevation of a vehicle with the invention applied. Fig. 2 is a longitudinal vertical section of the vehicle showing the apron in partly tilted position. Fig. 3 is a perspective view of the apron detached from the vehicle. Fig. 4 is a perspective view of the framework of the apron with the covering omitted. Fig. 5 is a sectional view on a larger scale than in the other views of a latch mechanism for holding the apron in the operative position.

Referring to the drawings, there is shown a vehicle comprising a body member 1, wheels 2, an axle 3, and shafts 4, all of the same general structure shown and described in Letters-Patent No. 973,390, for postman's delivery wagon granted to me on October 18, 1910, this patent also disclosing, but not claiming, the protecting apron in its more general features, but which in the showing of the present application differs from that shown in the said Letters-Patent in some details of construction.

Upon the body member 1 there is provided an elevated seat 5 and from the seat there is a bottom or foot-receiving member 6 having sides 7 and a front end or dash 8. The bottom member 6 with its sides 7 and the dash 8 constitutes a support for the protecting apron of the present invention and a protection for the feet of the occupant of the vehicle.

The apron structure comprises a skeleton frame made up of rear members 9, considering the apron as attached to a vehicle, bottom members 10, top members 11, front members 12, the said members 9, 10, 11 and 12 forming side frames which are connected together at the upper and lower front corners by connecting members 13 and 14, respectively. When the apron frame is mounted on the vehicle and is in its normal operative protective position, the rear members 9 of the frame are upright, while the front members 12 slant forwardly from the top toward the bottom, and the bottom members 10 are in an approximately horizontal position, the top members 11 slanting upwardly from the rear members 9 to the junction of the front members 12 with the connecting member 13. The sides of the apron frame are each in the form of a trapezium, while the front portion of the frame defined by the strips or members 12, 13 and 14 is in the general form of a rectangle.

The several members of the apron frame may be made of light wooden strips united at the junction points or may be made of metal of appropriate form, wherein lightness and strength may be properly combined.

Attached to the connecting member 14 are hinges 15 in suitable spaced relation, and these hinges connect to the upper edge of the dash 8, so that the apron frame is at all times in hinged connection with the said dash. The lower ends of the rear members 9 extend below the bottom members 10, as indicated at 16, and near the lower ends these portions 16 are each provided with a notch 17.

Fast to each side 7 is a sleeve 18 in size and shape adapted to receive the extension 16 of the respective side member 9, and each sleeve 18 carries a bracket 19 to which is pivoted a lever 20 having one arm formed with a tooth 21 adapted to extend through an appropriate perforation in the sleeve, so as to enter the interior of the sleeve, and this tooth is so positioned that when within the sleeve it will engage the notch 17 of the extension 16 then within the sleeve. The arm of the lever 20 carrying the tooth 21 is provided adjacent the tooth with a shoulder 22 adapted to abut against the sleeve 18 to thereby limit the movement of the tooth 21 into the sleeve and adjacent to this tooth the same arm of the lever is provided with an extension 23 which may terminate in a ball 24 or other suitable means, whereby the lever may be operated by the foot of the occupant of the vehicle. The end of the lever 20 remote from the tooth 21 is formed with an angle extension 25 also designed for the operation of the lever by the foot or hand of the occupant of the vehicle, and between this last named end of the lever and the sleeve 18 there is interposed a spring 26 tending at all times to maintain the tooth 21 in the sleeve 18, but yielding readily to a properly applied force. The tooth 21 may be so shaped as to permit the ready movement of the corresponding extension 16 into the sleeve until the tooth moves into locking relation to the notch 17, but the shape of the tooth may be such as to resist withdrawal of the extension 16 from the sleeve 18 until the tooth has been purposely moved out of the notch 17 by the occupant of the vehicle. The apron frame is thereby held positively in the protective position and may only be moved from this position by unlatching the frame from the latch sleeves 18, whereupon the frame may be tilted on the hinges 15 away from the occupant of the vehicle to permit such occupant to leave the vehicle or to enter the same.

The apron frame is provided on the sides and front with a covering 27 which may be composed of any suitable weather proof material, such as commonly employed for vehicle tops, and this covering material may be passed around the strips constituting the apron frame and the edges united to the body portion of the covering material by sewing or otherwise.

On the inner face of the covering material extending over the portion of the frame formed by the members 12, 13 and 14, there is secured a pocket 28 within convenient reach of the occupant of the vehicle, such pocket being particularly useful when the vehicle is employed by a postman.

As described in the aforesaid Letters-Patent, the sides of the upper portion of the vehicle are provided with curtains 29, in which are provided windows 30, and the front of the upper portion of the vehicle is provided with a drop 31 having therein a window 32. The drop 31 is so proportioned that it is met by the upper part of the apron frame defined by the strip 13, so that when the apron is in the protective position there is provided a front protective wall composed of the drop 31 and the inclined front portion of the apron, rain or snow being directed by these parts to and discharged over the front of the dash 8, so that the postman may use the vehicle in stormy weather without liability of getting wet, and without danger to the contents of the vehicle. The sides of the frame rest in close relation to the sides 7 of the foot receiving portion of the vehicle and rain or snow cannot enter the vehicle from the sides, while at the same time ample room is provided for the introduction of postal or other matter into the interior of the vehicle when the apron frame has been tilted forwardly out of the way, since the side curtains 29 are not carried lower than the seat 5, but the openings thus left are closed by the sides of the apron when the latter is in the protective position.

It will be observed that the apron frame is substantially a one piece rigid frame in the sense that it is non-collapsible, and the several parts maintain constantly the same relation one to the other, although this does not preclude the manufacture of the frame of several parts firmly united one to another. Furthermore, the frame moves as a whole without change of relation of the several parts on the hinges 15, and since the covering of the frame is not folded or loosened at any time, it is not liable to become distorted or worn or cracked, and may, if desired, be made of material of superior weather resisting qualities, which material, however, would not withstand the bending and creasing incident to the frequent collapsing of the apron frame were it of the collapsible type.

What is claimed is:—

1. A vehicle provided with a body portion having a seat and a bottom member with sides and with a dash at the front end of the bottom member, said body being also provided with a top having side curtains terminating at a distance above the sides of the bottom member, and a front drop, a protecting apron having a rigid non-collapsible frame hinged at the lower front portion to the dash and consisting of front and side members having side and front coverings, said apron when in operative position having the upper edge of the front member in coactive relation with the lower edge of the drop and its side members overlapping the side curtains and closing in the sides of the vehicle between the lower edges of the side curtains and the sides of the bottom member, and said side members being supported on the sides of the bottom member below the seat.

2. A vehicle provided with a body portion having a seat and a bottom member in front of the seat constituting a foot-receiving portion, and an apron having a non-collapsible sustaining frame with front and side portions, the apron frame being hinged at the lower front edge to the front end of the bottom member and when in position extending to the body portion of the vehicle and across the front and along the sides of the bottom member, and latches in the bottom member in position to be engaged by the foot of an occupant of the vehicle, said latches being adapted to engage the lower rear portion of the apron frame when in position to hold it in place.

3. A vehicle provided with a body portion having a seat and a bottom member constituting a foot-receiving portion, a protective apron having a rigid non-collapsible skeleton frame composed of front and side members connected together so as to move as a unit and provided with side and front coverings, said frame being hinged to the front of the bottom member and having the side members fitting at the rear in front of and close to the seat, and latches provided on one of the parts to engage the other for locking the said frame in closed position, said latches being positioned to be engaged by the foot of an occupant of the vehicle.

4. A vehicle provided with a body portion having a bottom member, a protective apron having a rigid non-collapsible frame with side and front coverings, said frame being hinged at the lower front edge to the front of the bottom member and at the rear lower portion provided with extensions constituting latch members, and latches on the bottom member in the path of the latch extensions of the apron frame, said latches each comprising a sleeve adapted to receive a corresponding extension of the apron frame, and a latch lever having a normal tendency toward operative position and carried by the sleeve, said latch lever having means engageable by the foot of an operator for actuating the latch lever.

5. A vehicle provided with a body portion having an elevated seat, and a bottom member constituting a foot receiving portion below the plane of the seat, a protective apron having a rigid non-collapsible skeleton frame composed of front and side members with front and side coverings, the entire apron being movable as a unit, means for hinging the front end member of the frame at its lower front edge to the upper front edge of the bottom member, the front member of the frame fitting along the front edge of the bottom member and the side members of the frame fitting within the sides of the bottom member when in closed position, said side members of the frame terminating in advance of but close to the seat, the bottom member constituting the sole support for the lower ends of the side members of the apron.

In testimony, that I claim the foregoing as my own, I have hereto affixed my signature in the presence of two witnesses.

GUSTAV F. SCHULZE.

Witnesses:
  R. F. READ,
  F. B. DETEINNE.

---

Copies of this patent may be obtained for five cents each, by addressing the "Commissioner of Patents, Washington, D. C."